S. C. SALISBURY.
Process of Reducing and Refining Metallic Ores and Oxides.
No. 65,122. Patented May 28, 1867.
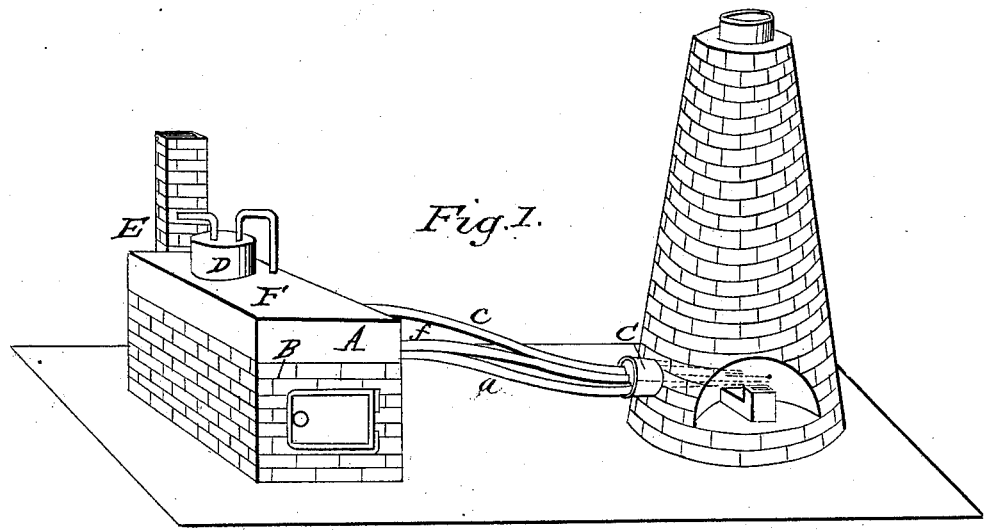
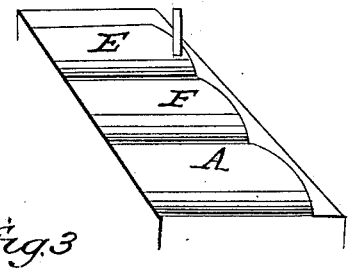
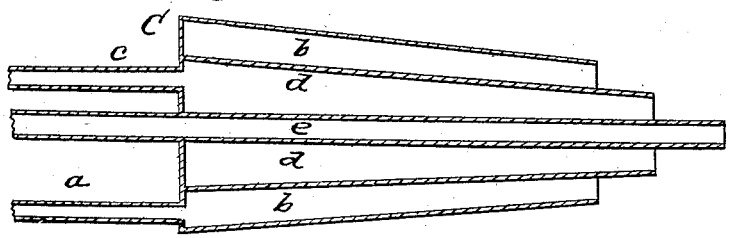
Witnesses
L. D. Law
Fred B. Sears
Inventor
S. Salisbury

United States Patent Office.

SILAS C. SALISBURY, OF NEW YORK, N. Y.

Letters Patent No. 65,122, dated May 28, 1867.

---

IMPROVED PROCESS OF REDUCING AND REFINING METALLIC ORES AND OXIDES.

---

The Schedule referred to in these Letters Patent and making part of the same.

---

TO ALL WHOM IT MAY CONCERN:

Be it known that I, SILAS C. SALISBURY, of the city of New York, in the county of New York, State of New York, have invented a new and improved Method or Process for Reducing and Refining Metallic Ores or Oxides; and I do hereby declare that the following is a full, clear, and exact description thereof, and of its mode or manner of operation, reference being had to the accompanying drawings, and to the letters of reference marked thereon, and making a part of this specification.

My invention consists in a new and improved method or process for reducing metallic ores or oxides, whether of iron or other metal, by which such ores are reduced much more rapidly and economically than by the ordinary processes, and by which, when iron ores are reduced, the metal obtained therefrom is made soft iron in the same furnace in which the ores are reduced without being first carbonized, as in ordinary blast furnaces, and then decarbonized by an after process, and is also refined while such ores are being so reduced and the metal obtained therefrom.

In describing my invention I show its application to the reduction of iron ores in the common blast furnace, but I do not intend to limit its application to such furnaces. The common ores of iron are oxides, with which are found mixed carbon, sulphur, phosphorus, and other metals or substances, and such ores are ordinarily smelted and reduced to a metallic state by being exposed, mixed with carbon in the form of coal, coke, or wood charcoal, to a high heat in a blast furnace. By such operation the ores become deoxidized, or their oxygen is removed by combustion with the carbon or fuel in the furnace, and the melted iron then descends or gravitates to the bottom or lower part of the furnace in the form of cast iron, or iron surcharged with carbon, and mixed also with many or most of the impurities found in the ore. This operation requires a large amount of fuel, and also consumes much time. The cast iron thus produced, being highly charged with carbon, has afterward to be decarbonized and converted into soft iron by puddling or some similar process. These processes or modes of treatment are in fact the opposite of each other, the ore, which is an oxide, being first deoxidized, the metal derived from it becoming charged with carbon in the blast furnace, and then afterward the metal thus carbonized being decarbonized by the application of oxygen, so as to convert the cast or hard iron into soft iron adapted to be applied to the various uses for which suitable.

My invention enables me to produce malleable or soft iron in the same furnace in which the ores are reduced, and while they are being reduced, at the same time also refining the ores from sulphur and other impurities, and also to reduce the ore and convert it into soft iron in a less time and at less expense than has heretofore been required to convert it into cast iron.

It is essential to the perfect working and operation of a blast or other furnace used for reducing metallice ores, that the ores should arrive at the boshes or place of conversion completely reduced or calcined, and freed to as great a degree as possible from the impurities found in the ores, and also that the temperature of the furnace should be sufficiently great and supplied with a sufficient amount of carbon to convert the carbonic acid into carbonic oxide, and to utilize the gases produced in the furnace.

The great difficulty that exists in ordinary blast furnaces is that the combustion therein is imperfect, the heat produced from the coal and blasts of the furnace being only just about sufficient above the boshes to disengage the gases from the ores and lime and fuel, and set them free without utilization. The lighter gases are carried off from the top of the furnace, and the heavier ones fall and produce carbonic acid, which absorbs a large amount of the latent heat so essential for the rapid conversion and liquefaction of the ores not previously fully prepared and roasted, and such ores consequently retain a large proportion of their impurities, as sulphur, phosphorus, &c., which, as they are disengaged, continue their affinity for the liquid ores. The iron produced is thus full of impurities, derived both from the minerals and the coal.

By my process I overcome and remove these defects or imperfections by greatly increasing the temperature of the furnace by introducing therein hydrogen and oxygen heated to a temperature of from 700° to 800° or more Fahrenheit, and under pressure, and by introducing along with such hydrogen and oxygen and the air-blast, hydrocarbon gas wholly free from sulphur, phosphorus, or ammonia, and causing these several gases to penetrate and pervade the whole mass of the ore. The drawings illustrate the application of my process to an ordinary blast furnace.

Figure 1 represents an ordinary blast furnace in connection with a furnace retort for preparing and supplying the hydrogen and oxygen and hydrocarbon gases in combination with the air-blast.

Figure 2 shows the several retorts.

Figure 3 is an enlarged view of the compound tuyere for supplying such gases to the blast furnace.

The air-blast may be heated in any convenient manner. The drawings show a retort, A, in a furnace, B, designed for such purpose, from which retort the air passes by a pipe, $a$, to the outer chamber or division $b$ of the tuyere C. In actual operations, the air-blast after being heated will first pass to the blowing engines, and from them be delivered to the tuyere and into the furnace. The carbon gas is to be obtained from oils or hydrocarbons which are wholly free from sulphur, phosphorus, ammonia, or like impurities. Such oils are first vaporized in a suitable vaporizer, D, from which the vapor is conveyed to a highly heated retort, E, in passing through which such vapor is converted into a fixed gas, and also highly heated, and is then conveyed by a pipe, $c$, to the chamber $d$ of the tuyere. The hydrogen and oxygen gases may be prepared separately, but are usually obtained from water or steam passed through a retort, F, the heating surface of which may be increased by diaphragms of perforated metal or their equivalent, which retort is heated sufficiently so that the steam is nearly or actually decomposed and resolved into its hydrogen and oxygen gases. Such gases, before they pass from such retort, are also to be subjected to a pressure of from fifteen to twenty pounds the square inch, or such that they will pass into the tuyere with greater force or pressure than does the air-blast, so that they will not be forced back by such blast. Such gases enter the central division $e$ of the tuyere, by means of a pipe, $f$. It is not necessary, however, that the steam should be actually decomposed before it enters the furnace, as it will be resolved into its gases immediately after it enters therein. But if not actually decomposed before entering the furnace it should be heated to 700° to 800° or more Fahrenheit, so that it will enter the furnace at a temperature but little below the point of decomposition. The tuyere, as will be apparent from the foregoing description, instead of being a single tube or pipe, as heretofore constructed, is a compound instrument composed of a central and two concentric or external tubes or pipe, so that different gases or blasts can be supplied to its different chambers. Such construction of tuyere is shown more plainly in fig. 3. In order also to deliver, if desired, several gases into the furnace at varying points, the several tubes of the tuyere may project unequally into the furnace, as also shown in fig. 3. The hydrogen and oxygen gases being subjected to a very considerable pressure before they leave the retort, are thereby forced through the tuyere and into the furnace, and carry along with them the hydrocarbon gas, and also assist in forcing the air-blast into the furnace, thereby rendering unnecessary as large and powerful blowing engines as are usually required. A much less quantity of air-blast is also required when such gases are used in connection therewith, not more than one half as much being necessary as when used by itself.

The quantity and proportion of such hydrogen and oxygen and hydrocarbon gases will vary somewhat, according to the character and purity of the ores to be reduced, but the use of about thirty gallons of water to about two gallons of hydrocarbon oil for the production of such gases has been found to be very satisfactory. The proper supply and quantity of these gases is regulated and controlled by suitable valve-cocks. By introducing these gases into the furnace under pressure, as mentioned, they are caused to penetrate to the very centre of and pervade the whole ore mass; and by their high temperature they increase greatly the heat of the furnace, by reason of which increased temperature, together with the additional supply of carbon from the hydrocarbon gas, which is many more times dense and richer than the coal gases, the carbonic acid in the furnace is converted into carbonic oxide, and the gases introduced ascending and mixing with the gases of the furnace form with them a complete combustion, and thus utilize such gases; such combustion also increasing the heat and more effectually and rapidly reducing the ores and preparing them for immediate and rapid conversion to liquefaction. Such gases having also a greater affinity for the sulphur, phosphorus, ammonia, &c., contained in the coals and ores than the roasted or liquefied ores have, these impurities are consumed or carried off, and the metal thereby freed therefrom. The ores are thus both more rapidly reduced, and also desulphurized or refined at the same time. By having an entire control over the quantity and quality of the several gases used I am able to produce either harder or softer iron, or to change its character, as desired.

By the use of such gases, magnetic sulphurous ores, which are of but little value when smelted in the ordinary manner, can be converted into the first quality of pig-iron, and even from ordinary or medium ores there is obtained that quality of iron, being free from sulphur, phosphorus, and like impurities, which is so much desired for the manufacture of steel. Scrap iron, unfit even for the most ordinary kind of cast iron, has been found to produce, when subjected to the action of such gases, castings equal to those obtained from the best pig-iron as prepared in common furnaces, and the use or mixture of Scotch pig-iron to improve the character of the metal obtained from common ores, can also be dispensed with.

By the use of such gases there is produced a free and easy flow of the slag, thereby preventing any accumulation of it or other matter on the inner surface of the furnace; the previous roasting, calcining, or desulphurizing of the ores before they are supplied to the furnace is unnecessary; the quality of the metals is improved by the increase of temperature, whereas in the ordinary furnaces, if the temperature is increased beyond a certain degree, the metals are injured; less air-blast is required and less power to force it into the furnace; less fuel is consumed; there is an increased production and an improved quality of metal; scrap and debris burnt iron that is now almost wholly useless can be rendered of use and value; and accidents such as arise from the cooling of the furnace are prevented or rendered impossible, as by increasing the quantity of the gases, the temperature can be so increased as to effectually prevent their occurrence. The character of the iron will also be improved by introducing into the furnace, as the ores are being reduced and the metal derived therefrom purified, a small quantity of the oxide or peroxide of manganese, about one per cent. of the quantity of metal to be produced. I consider it most preferable to introduce such manganese in connection with the hydrocarbon gas, with which it can be introduced in the form of a powder.

What I claim as my invention, and desire to secure by Letters Patent, is—

1. The application and use, in blast and other like furnaces for reducing metallic oxides, of a blast of hydrogen and oxygen gases, or their equivalent, when heated to a temperature of from 700° to 800° Fahrenheit, or thereabouts, for the purposes set forth.

2. The use in such furnaces, in combination with such blast of hydrogen and oxygen gases, or their equivalent, heated as described, of carbon gas when free from or obtained from hydrocarbons free from sulphur, phosphorus, ammonia, &c., for the purposes set forth.

3. The use in such furnaces of such blast of hydrogen and oxygen gases, or their equivalent, so heated as described, and of such carbon gas free from sulphur, phosphorus, ammonia, &c., in combination with the ordinary air-blast for the purposes set forth.

4. In combination with blast and other furnaces used for reducing ores, the use of a compound or divided tuyere, constructed substantially as described, for supplying to such furnaces such blasts of different character, substantially as and for the purposes set forth.

5. The use, in blast and other furnaces used for reducing ores, of manganese, substantially as and for the purposes set forth.

S. C. SALISBURY.

Witnesses:
  S. D. LAW,
  FRED. B. SEARS.